United States Patent

[11] 3,609,427

| [72] | Inventors | Max E. Lautner<br>Alexandria Bay;<br>George Hale Smith, Sackets Harbor, both of N.Y. |
|---|---|---|
| [21] | Appl. No. | 36,766 |
| [22] | Filed | May 13, 1970 |
| [45] | Patented | Sept. 28, 1971 |
| [73] | Assignee | Bomax Division, Gould Inc.<br>Watertown, N.Y. |

[54] FIELD COIL STRUCTURE FOR ELECTRIC MOTOR
3 Claims, 11 Drawing Figs.

[52] U.S. Cl....................................... 310/194,
310/43, 310/258, 336/192, 336/208
[51] Int. Cl...................................... H02k 3/52
[50] Field of Search............................... 310/194,
43, 214–218, 258, 259, 269, 198; 335/297;
336/192, 208, 184, 185, 218

[56] References Cited
UNITED STATES PATENTS

| 2,999,176 | 9/1961 | Lindstrom et al............ | 310/43 X |
| 3,339,097 | 8/1967 | Dunn......................... | 310/194 |
| 3,259,864 | 7/1966 | Marzolt et al................ | 336/192 |

FOREIGN PATENTS

| 759,960 | 10/1956 | Great Britain............... | 310/43 |

Primary Examiner—D. F. Duggan
Assistant Examiner—B. A. Reynolds
Attorney—Bruns & Jenney ABSTRACT: An electric motor has a stator ring and a separate stator yoke spaced therefrom and having pole tip projections adapted to be pressed in place inside the ring. A stator coil supporting structure of bendable plastic has a pair of bobbins with central apertures therethrough in which the pole tip projections are adapted to fit and radially projecting flanges adapted to extend along the inner and outer sides of a coil wound on each bobbin. An integral connecting strip is joined to one side of each inner bobbin flange for supporting the crossover wire between the coils, the structure being adapted to be bent on either side of the connecting strip into a generally U-shape. The strip has tubular securing portions for the inner ends of a pair of lead wires and has a projecting tab adapted to be bent and folded down over the crossover wire, a portion of the tab being adapted to snap into a recess formed between the tubes by projections on the tubes.

PATENTED SEP 28 1971 3,609,427

INVENTORS.
MAX E LAUTNER &
GEORGE HALE SMITH
BY
Bruns and Jenney
ATTORNEYS.

FIELD COIL STRUCTURE FOR ELECTRIC MOTOR

BACKGROUND OF THE INVENTION

This invention relates to a field coil structure for small electric motors and more particularly to a coil bobbin and insulator structure on which the coils are wound and secured.

Field coils for the stator section of subfractional horsepower motors, such as are used in electric typewriters, cooling fans and the like, are wound with particularly fine wire and must be supported free of the rotor and the leads to the coils and the crossover wire between the coils must be securely supported and insulated from the rest of the motor.

Prior art field coil structures provide for wrapping the coils and crossover wires with insulating tape, enclosing opposite sides of the coil in tubular insulators or in insulating clips, guarding the coil with holdbacks or insulating clips attached to the stator ring, and supporting lead wires and crossover wires from such insulating means. All these coil and wire support means involve a multiplicity of parts and are time consuming to assemble.

SUMMARY OF THE INVENTION

The present invention contemplates mechanically winding two or more connected coils on a unitary coil supporting structure comprising a bobbin or spool for each coil, the bobbins being connected by a strip which is adapted to support the crossover wire and secure the ends of the lead wires without strain on the coil ends. The material used for the support structure is a bendable molded plastic which has good electric insulation qualities and has low moisture absorbance. By carefully not curing too much, this material becomes bendable in a known manner and may be bent like a soft metal while retaining good supporting characteristics.

In motors having an outer stator ring and a separate inner stator yoke which are assembled together, the yoke having pole tip projections, the stator coils, wound on the bobbins complete with leads connected and secured may be assembled around the pole tip projections before the ring and yoke are assembled by bending the structure along bend lines at the junction of the bobbins with the connection strip to form diametrically opposite coils around the pole tip projections, the bobbins being connected by the strip, the strip and bobbins occupying the spaces between the outer ring and the inner yoke. Bearing elements for the rotor are then added for rotatably supporting the rotor in place.

DESCRIPTION OF THE PREFERRED EMBODIMENT

Figure 1:
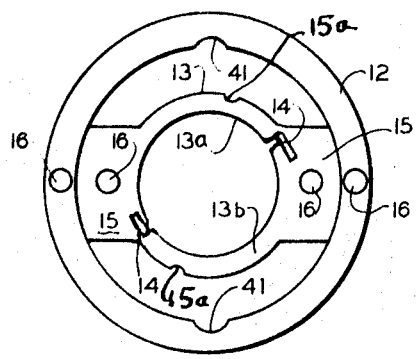
FIG. 1 is an end elevation view of a stator ring and yoke of motor assembled without coils.
Figure 2:
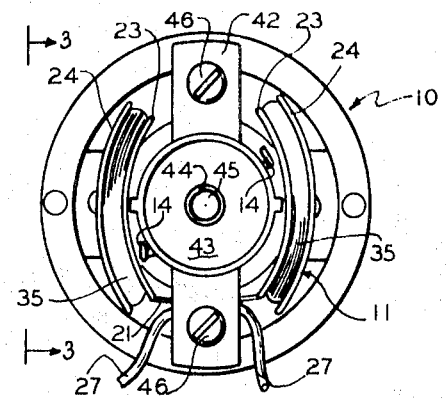
FIG. 2 is an end elevational view of a motor assembled with the stator coils and the supporting structure according to the invention together with bearing elements and rotor.
Figure 3:
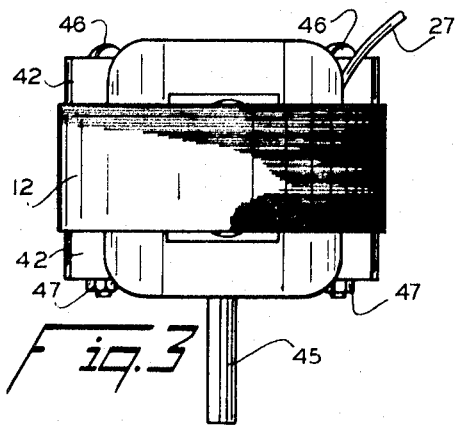
FIG. 3 is a side elevational view of the assembly of FIG. 2 as viewed in the direction of the arrows 3—3 in the latter FIG.
Figure 9:
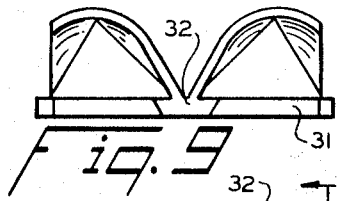
FIG. 9 is a further enlarged end view as viewed from the upper end in FIG. 6.

Referring to FIGS. 1-3, the electric motor 10 in which the coil support 11 of the invention is intended for use is a shaded pole motor having two poles. The stator assembly, less coils, is shown in FIG. 1 and comprises an outer stator ring 12 and an inner stator yoke 13 spaced therefrom. The yoke 13 has copper shading coils 14 assembled and connected as shown in FIG. 1, the shading coils being strips of copper disposed in appropriate slots and having their ends bent over and welded to the stator coil pole tips. The shading coils 14 are located adjacent the restricted pole tip portions 15a of yoke 13.

The yoke 13 has pole tip projections 15 integral therewith extending diametrically oppositely from the assembled yoke so that the yoke is assembled and secured inside the ring with a press fit. Both yoke 13 and ring 12 comprise a plurality of metal layers secured together in the usual manner with rivets 16.

Figure 4:
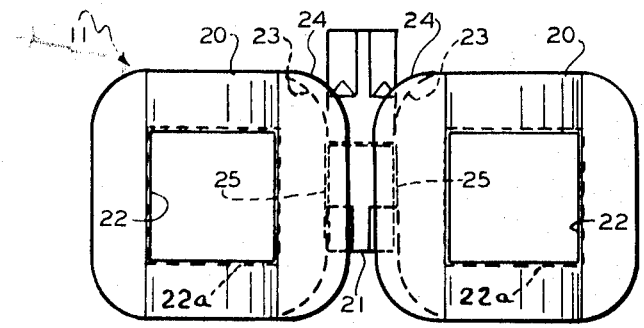
FIGS. 4 and 5 are plan and end elevational views, respectively, of the coil supporting structure prior to winding the coils thereon.
Figure 5:
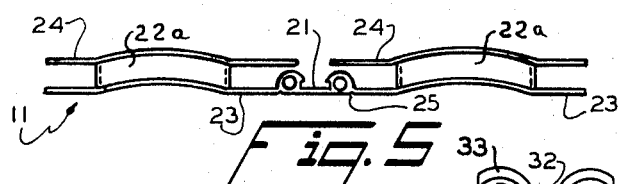

The coil supporting structure 11, best seen in FIGS. 4 and 5, comprises two bobbins or spools 20 on which the coils are wound and a connecting strip 21. Each bobbin 20 has a rectangular aperture 22 axially therethrough, in which a pole projection tip 15 is adapted to fit, a drum 22a around the aperture on which the coil is wound, and a radially projecting, generally rectangular inner flange 23 and outer flange 24 adapted to protect the coil wound thereon as shown in FIG. 2.

Figures 10, 11:
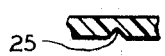
FIG. 10 is a further enlarged sectional view across one of the bend slots shown in FIG. 4.
FIG. 11 is an end view similar to FIG. 8 showing the connecting strip tab after it has been folded and locked in place.

The structure 11 is of molded plastic such as nylon of "Zytel 101," a grade of material which is flexible and can be bent without breaking when notched as shown at 25, as best seen in FIG. 10. V-notches 25 are provided in the inner surface at either side of the connecting strip 21 where the strip joins the inner flanges 23 of the bobbins 20, as shown in FIGS. 4 and 5, so that the structure 11 can be bent into the U-shape shown in FIG. 2.

The central drum portion of each bobbin 20 around the aperture 22 is molded on a curve, as shown, and the flanges 23 and 24 are flexible enough to assume this shape when folded onto the yoke 13 and assembled inside of the ring 12. It will also be noted that the outer flanges 24 are wider than the inner underlying flanges 23 at the center of the structure 11.

Figure 8:
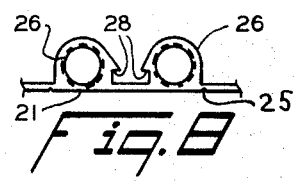
FIG. 8 is an end view as viewed from the lower end in FIG. 6.

The connecting strip 21, best seen in FIGS. 6, 7, 8 and 9 has two securing tubes 26 for the coil leads 27 molded integral therewith and these tubes have a toothlike projection along the side providing a shoulder 28 along each tube between the tubes and facing the strip, as best seen in FIG. 8. Strip 21 also has another V-notch 30 thereacross, best seen in FIG. 7, where a foldable tab 31 integral with the strip may be folded or bent. The end of tab 31 terminates in a foot 32 with tapered sides which may be forced or snapped into the recess between tubes 26 so as to be locked in place by the shoulders 28 when the tab is folded over along the notch 30, as shown in FIG. 11. Winglike hoods 33 project from the surface of foot 32 so as to fit over the tubes 26 when the foot is snapped in place.

Figures 6, 7:
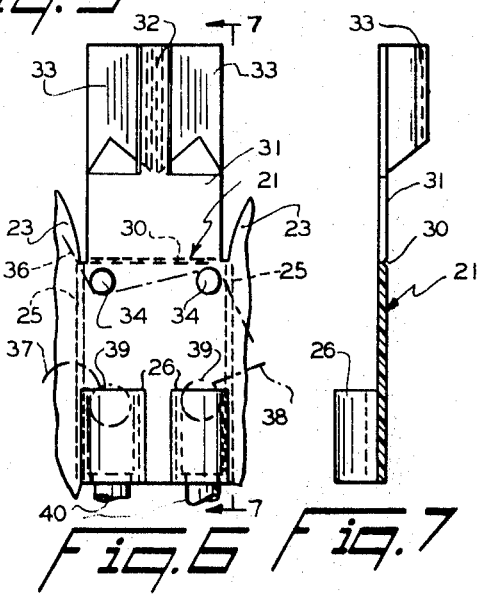
FIG. 6 is an enlarged fragmentary view of the connecting strip portion of the structure of FIG. 4.
FIG. 7 is a sectional view on the line 7—7 of FIG. 6.

The connecting strip 21 has two die holes 34 near the fold line 30 for protruding pins on the winding mandrel for positioning the crossover wire when it is wound. When the left-hand coil 35 has been wound, the crossover wire, indicated by the broken line 36 in FIG. 6, is led over the pins before winding the right-hand coil 35. When the structure is removed from the mandrel, the crossover wire is thus fixed in place.

The coil end wires indicated at 37 and 38, are then wound around and attached by solder at 39 to insulated lead wires 40 as hereinafter described.

To assemble the coil-supporting structure 11 in the motor 10 it is first bent along the notch-lines 25 by bending the bobbins downward, as viewed in FIG. 5, and placed in a holding die, not shown, and first one coil is wound by a conventional coil winding machine. The crossover wire 36 is then led across the strip 32, as described above, and the second coil 35 is wound. Insulated lead wires 40 having stripped ends are then inserted through the tubes 26. A brass eyelet is placed over the stripped lead end so that the eyelet rests next to the insulation. The coil ends 37 and 38 are then attached to the stripped end of a respective lead wire by wrapping the coil end around the stripped end close to the eyelet. The wrapped-around coil end and the eyelet are soldered to the lead wire and the excess of the stripped end is cut off leaving an enlargement indicated at 39 at the end of each lead wire. The still-warm soldered connection is then drawn within the tube 26 so that the eyelet is seated against a step in the tube thus providing a strain relief for the lead wire. The process of connecting the coil wire and eyelet to the lead wire end pulling the connection into the tube is more fully described in U.S. Pat. No. 3,259,864 issued July 5, 1966, to Marzolf and Lautner.

The structure 11 with its wound coils 35 is then folded around the yoke 13, with the pole tip projections 15 through apertures 22 of the bobbins, and yoke 13 is then pressed within ring 12.

It will be noted that the ring 12 has a pair of diametrically opposite semicircular grooves 41 along its inner surface and these serve as aligning means for rotor support bars 42, shown in FIGS. 2 and 3, the bars having semicircular projecting tongues, not shown, adapted to be seated in the grooves. Each of the bars 42 have a circular portion 43 at their center containing a journal 44 pressed into the bar for the rotor shaft 45. The bars 42 have appropriate holes therethrough so that they can be secured in place by the screws 46 and nuts 47.

After the structure 11 has been assembled in place, of course, the rotor, not shown, can be assembled and the bars 42 secured in place by the screws 46 and nuts 48 to complete the assembly of the motor.

While a shaded pole motor has been shown and described, it will be apparent that structure 11 may be utilized in any motor having a stator ring and a separate stator yoke spaced therefrom with pole tip projections adapted to be contained in the bobbin apertures of the structure.

We claim:

1. A stator assembly for an electric motor having a stator ring and a separate stator yoke spaced therefrom, the yoke having a plurality of radially spaced pole tip projections engaged with the stator ring, a unitary coil supporting structure having a coil supporting bobbin for each pole tip projection, each bobbin having an aperture axially therethrough in which the pole tip projection lies, each bobbin having a drum around the aperture on which its coil is wound and a radially projecting inner and outer flange protecting the sides of its supported coil, the inner flanges of adjacent bobbins being connected by a connecting strip adapted to support the connecting wire between coils, the supporting structure being of bendable plastic and adapted to be bent at the junction lines between junction strip and bobbin, at least one connecting strip having integral tubular projections and lead wires connected to the coil end wires secured in the said projections, whereby the coil supporting structure can be folded around the stator yoke prior to assembling the yoke in the stator ring.

2. Stator coil supporting structure for an electric motor having a stator ring with a separate stator yoke spaced inward therefrom, the yoke having diametrically opposite pole tip projections adapted to engage the ring, the supporting structure comprising a pair of bobbins, each having an aperture axially therethrough in which a pole tip projection is adapted to extend, a coil wound on each bobbin, and inner and outer radially projecting flanges on the bobbin adapted to protect the sides of the coils, a connecting strip integral with the bobbins being joined to one side edge of the inner flange of each bobbin, the structure being of bendable plastic material and adapted to bend along the joint on each side of the strip into a generally U-shape with the pole tip projections extending through the bobbins, the connecting strip being adapted to support the crossover wire between coils, and tubes integral with the strip and adapted to secure therein the inner ends of lead wires joined to the coil ends providing suitable strain relief and insulation of lead to coil wire connections.

3. Coil-supporting structure defined in claim 2 and having an integral tab projecting from one end of the connecting strip, each strip tube having a projection therealong forming a shoulder spaced from and facing the strip between the tubes, the tab being adapted to be bent and folded down over the tubes, the tab having a foot with tapered sides adapted to be forced down between the tubes and to be engaged by the downwardly facing shoulders.